United States Patent [19]
Van De Griend

[11] Patent Number: 4,902,163
[45] Date of Patent: Feb. 20, 1990

[54] TWO PARTS SECURED BY BALL ST40 CONNECTION

[75] Inventor: Jan M. Van De Griend, Dordrecht, Netherlands

[73] Assignee: U.S. Philips Corporation, New York, N.Y.

[21] Appl. No.: 165,871

[22] Filed: Mar. 8, 1988

Related U.S. Application Data

[60] Division of Ser. No. 935,061, Nov. 21, 1986, Pat. No. 4,752,026, which is a continuation of Ser. No. 797,742, Nov. 7, 1985, abandoned, which is a continuation of Ser. No. 508,222, Jun. 27, 1983, abandoned.

[30] Foreign Application Priority Data

Jun. 28, 1982 [NL] Netherlands ................... 8202597

[51] Int. Cl.⁴ ................... B25G 3/00; E05D 7/00
[52] U.S. Cl. ................... 403/375; 16/224
[58] Field of Search ................... 24/297; 403/DIG. 6, 403/375, 122; 16/224, 43, 111 R

[56] References Cited

U.S. PATENT DOCUMENTS

| | | | |
|---|---|---|---|
| 3,246,440 | 4/1966 | Meyer | 24/297 |
| 3,248,995 | 5/1966 | Meyer | 24/297 X |
| 3,367,082 | 2/1968 | Meyer | 24/297 X |
| 3,475,794 | 11/1969 | Seekerson | 24/297 |
| 3,544,259 | 12/1970 | Fujita | 403/122 |
| 3,614,375 | 10/1971 | Becker . | |
| 3,629,544 | 12/1971 | Becker . | |
| 3,774,009 | 11/1973 | Hodges . | |
| 3,841,044 | 10/1974 | Brown et al. | 24/297 X |
| 3,975,611 | 8/1976 | Gordon . | |
| 4,068,342 | 1/1978 | Carrier | 16/43 |
| 4,120,641 | 10/1978 | Myles . | |
| 4,130,751 | 12/1978 | Gordon . | |

FOREIGN PATENT DOCUMENTS

| | | | |
|---|---|---|---|
| 1319794 | 1/1963 | France | 24/297 |
| 090032 | 11/1981 | Japan . | |
| 70987 | 10/1952 | Netherlands . | |
| 323832 | 1/1930 | United Kingdom | 24/297 |
| 498821 | 1/1939 | United Kingdom | 16/111 R |
| 1149268 | 4/1969 | United Kingdom | 24/297 |
| 1171168 | 11/1969 | United Kingdom | 24/297 |

Primary Examiner—Nicholas P. Godici
Assistant Examiner—Carmine Cuda
Attorney, Agent, or Firm—Brian J. Wieghaus

[57] ABSTRACT

The invention relates to a method of securing a first part made of a thermoplastic material to a second part made of an electrically conductive material, a connector mode of an electrically conductive material being placed in the part made of a thermoplastic material and subsequently being welded to the part made of an electrically conductive material. A metal ball is used for the connector, which ball is inserted into an opening in the first part and is brought into contact with the second part, after which the ball is welded to the second part by means of a welding electrode.

10 Claims, 2 Drawing Sheets

4,902,163

TWO PARTS SECURED BY BALL ST40 CONNECTION

This is a division of application Ser. No. 935,061 filed Nov. 21, 1986 U.S. Pat. No. 4,752,026 which is a continuation of Ser. No. 797,742 filed Nov. 7, 1985 abandoned which is a continuation of Ser. No. 508,222 filed June 27, 1983 abandoned.

BACKGROUND OF THE INVENTION

The invention relates to a first method of securing a first part to a second part made of an electrically conductive material, a connecting means made of an electrically conductive material being arranged in the first part and subsequently being welded to the second part.

Such a method is known from, for example, Netherlands Patent Specification no. 70987. This method employs connecting means of a special shape, which moreover have to be brought into a well-defined position relative to the parts to be secured to each other.

SUMMARY OF THE INVENTION

The invention aims at providing a method which can be readily automated and which employs simple connecting means.

According to the invention the method is characterized in that a metal ball is used as the connecting means. The ball is arranged in an opening in the first part, which is made of a thermoplastic material, and is brought into contact with the second part, after which the ball is welded to the second part by means of an electrode.

The ball forms a fixing means which, as a result of its shape, does not have a preferred position. The supply of a ball to and its insertion into an opening in the first part can therefore be readily mechanized, so that the method in accordance with the invention is well-suited for mass production.

During welding of the ball to the second part heat is developed, causing the thermoplastic material of the first part in the region of the ball to melt. As is shown clearly in the drawing, the welding current and pressure are selected so that the ball retains a generally spherical shape after welding, thereby defining a region or space between the ball, where portions of it overhang the second part, and the second part. The space between the ball and the second part is then filled at least partly, so that after cooling the first part is secured to the second part.

The invention also relates to a second method of securing a first part to a second part made of an electrically conductive material, a connecting means made of an electrically conductive material being welded to the second part.

According to the invention this method is characterized in that a metal ball is employed as the connecting means, which ball is brought into contact with the second part and is welded to the second part by means of an electrode, after which the first part, which is made of a plastic material, is fitted. The ball slides into an opening in the first part, in which opening it is secured by clamping.

Preferably, the opening in the first part is provided with a constriction, which may be formed by a circumferential rim which projects into the opening or by one or more protrusions which project into the opening. When the first part is fitted, the greater part of the ball slides past the constriction, so that a sort of snapped connection is formed between the first part and the ball.

This method is also very suitable for mass production and has the additional advantage that it is not necessary for the material of the first part to have specific plasticizing properties. The first part may therefore be a part made of a thermosetting plastic or a thermoplastic material.

Both methods may be used in various fields in the mechanical-engineering and electrical-engineering industries, in particular in those cases where for example a plastics part is to be secured permanently to a metal part.

Fields in which the invention may be used are for example: the manufacture of cars, toys, domestic appliances etc.

The invention also provides a product comprising two parts which are secured to one another by one of the methods.

Embodiments of the invention will now be described in more detail, by way of example with reference to the drawings.

DESCRIPTION OF THE PREFERRED EMBODIMENTS

Figure 1:
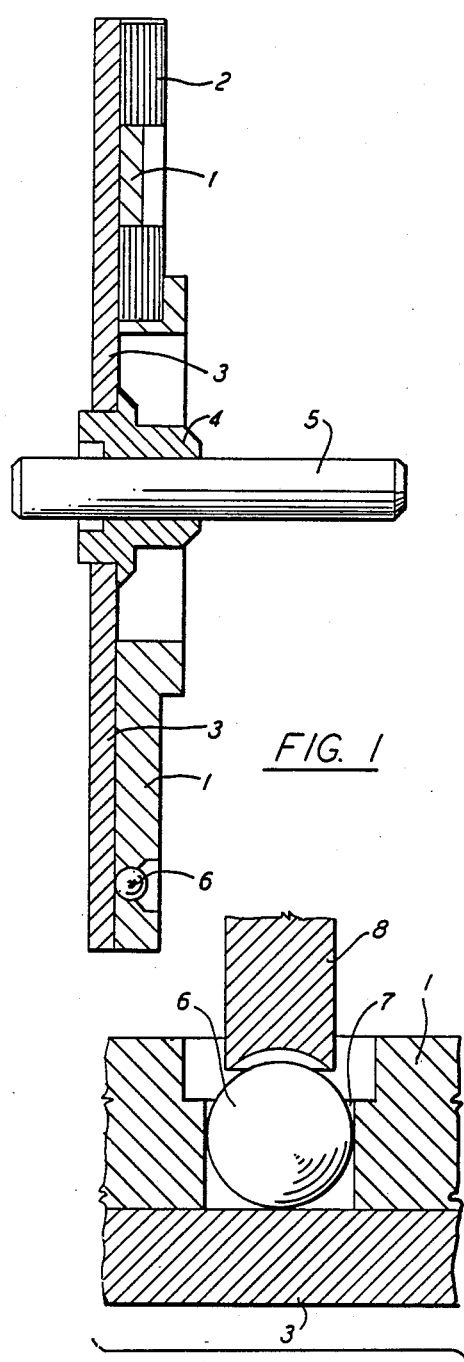
FIG. 1 is a sectional view of a rotor of an electric motor two parts of which are connected to each other by one of the methods in accordance with the invention.
Figure 2:
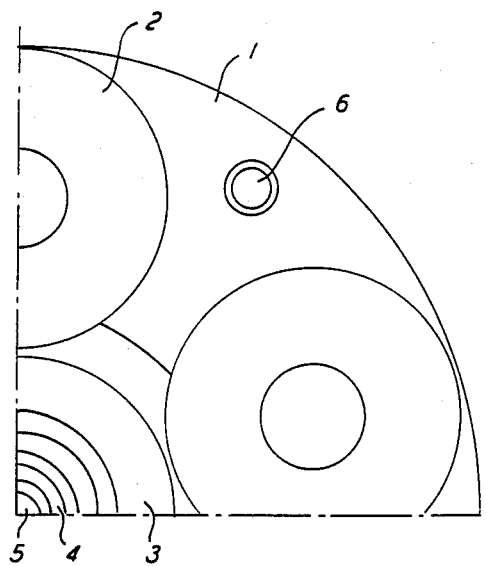
FIG. 2 is a view of a sector of the rotor shown in FIG. 1.

The rotor shown in FIGS. 1 and 2 comprises a disc made of a thermoplastic material, for example, a thermoplastic synthetic resin. A plurality of coils 2 are arranged in the disc 1, which coils are regularly distributed around the periphery of the disc. The disc 1 is mounted on the shaft 5 of the rotor by means of a flange 3 on a hub 4.

Figure 3:
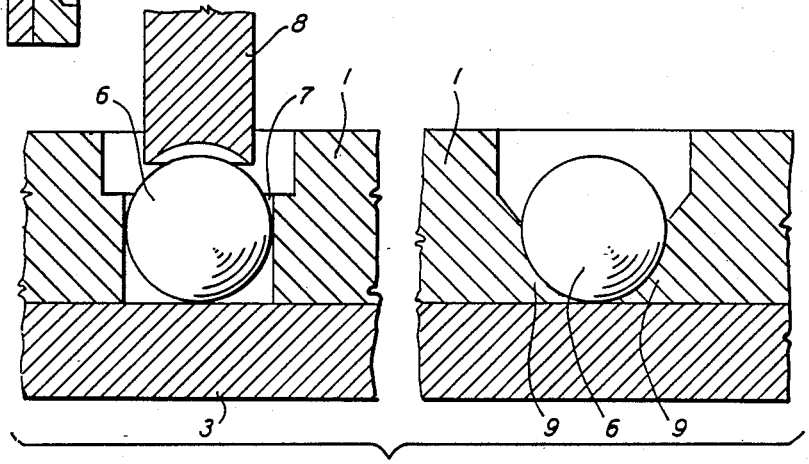
FIG. 3 shows two sectional views on an enlarged scale, taken at the location of the ball in different stages of the first method.

For securing the plastic disc 1 to the flange 3, which is made of an electrically conductive material such as metal, metal balls 6 are used. The disc 1, which in the present case constitutes the aforementioned first part made of a thermoplastic material, is formed with openings 7 in the form of through bores in the disc. At least at the end of the opening 7 adjoining the flange 3, the opening has a diameter generally equal to that of the ball 6. A ball 6 is inserted into an opening 7 and is brought into contact with the aforementioned second part, constituted by the flange 3. Subsequently, the ball 6 is brought into contact with the electrode 8 of a welding apparatus, known per se (see the left-hand half of FIG. 3). The flange 3 is connected into the electric circuit of the welding apparatus with a polarity opposite to that of the electrode 8, so that the ball 6 is thereby welded to the flange 3. Since the disc 1 is made of a thermoplastic material, the heat developed during welding causes the thermoplastic material of the disc 1 in the region of the ball 6 to melt and at least partly fill the space 9 the overhanging portions 16 of between the ball 6 and the flange 3 (see the right-hand half of FIG. 3). As a result of this and of the adhesion of the material of the disc 1 to the ball 6 and the flange 3, a firm fixture of the disc 1 to the flange 3 is obtained.

Figure 4:
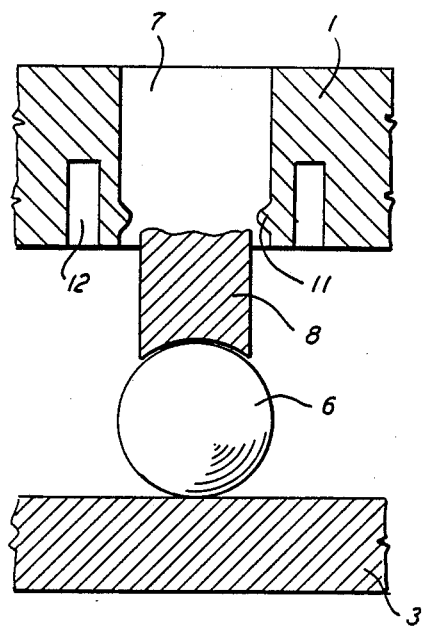
FIG. 4 is a sectional view on an enlarged scale, taken at the location of the ball in one of the stages of the second method.
Figure 5:
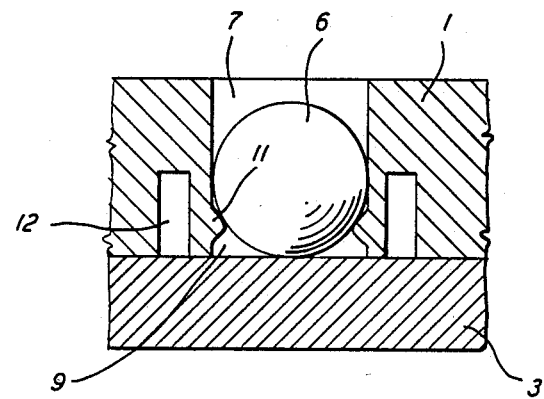
FIG. 5 is a sectional view, similar to that of FIG. 4, in a later stage of the second method.

The second method of securing the disc 1 to the flange 3 will now be described with reference to FIGS. 4 and 5. First a ball 6 is brought into contact with the flange 3. Subsequently, the flange 3 is connected into an electric circuit of a welding apparatus with a polarity opposite to that of the electrode 8, so that the ball 6 is welded to the flange 3. After this the electrode 8 is removed and the disc 1 is pressed onto the flange 3 (see FIG. 5), the ball 6 being slidably snapped into the opening 7 past a circumferential rim 11. In the final stage the rim 11 is situated in the space 9 between the ball 6 and the flange 3. The abutment of the rim 11 against the ball 6 ensures a firm fixture of the disc 1 to and the flange 3. In order to facilitate mounting of the disc 1, this disc is provided with a continuous groove 12 in the present example.

What is claimed is:

1. An article of manufacture, comprising:
   a first part having a first surface, said first surface being smoothly extending and free of protrusions;
   a second part for attachment to said first part, said second part having a second surface to be secured against said first surface; and
   a spherical attachment stud having a predetermined diameter fixed directly to said first surface of said first part, said stud having a hemispherical surface facing said first part,
   said second part having a cylindrical bore for receiving said spherical stud, said bore extending into said second part from said second surface and said bore having an inner surface, the diameter of said bore being chosen such that said bore inner surface is in contact with said spherical stud when said stud is received in said bore, and
   said second part having a protrusion on said inner surface of said bore, said protrusion being spaced from said second surface and sized such that when said spherical stud is received in said bore and said second surface is in contact with said first surface, said protrusion engages said hemispherical stud surface for holding said first surface against said second surface and securing said first part to said second part, and said second part in the region of said protrusion being resilient for allowing the passage of said protrusion over the diameter of said spherical stud when said first part is assembled on said second part.

2. An article of manufacture as claimed in claim 1, wherein said second part comprises a plastic.

3. An article of manufacture as claimed in claim 2, wherein said resilient region of said second part comprises a circumferential groove surrounding said bore.

4. An article of manufacture as claimed in claim 3, wherein said first part and said spherical stud are metallic and said stud is welded to said first part.

5. An article of manufacture as claimed in claim 1, wherein said resilient region of said second part comprises a circumferential groove surrounding said bore.

6. An article of manufacture as claimed in claim 1, wherein said first part and said spherical stud are metallic and said stud is welded to said first part.

7. An article of manufacture, comprising:
   a first part having a first planar surface, a second part for attachment to said first part having a second planar surface, and securing means for securing said first part to said second part with said first planar surface in pressing contact with said second planar surface,
   said securing means comprising
   a spherical attachment stud fixed directly to said first surface, said stud having a hemispherical surface facing said first surface,
   a cylindrical bore extending into said second part from said second surface, said bore having an inner surface and the diameter of said bore being chosen such that said inner surface is in contact with said spherical stud when said stud is secured in said bore and said second surface is in contact with said first surface, and a circumferentially extending protrusion on said bore inner surface spaced from said second surface and sized for engaging said hemispherical surface of said spherical stud for fixing said first planar surface against said second planar surface and securing said first part to said second part, and said second part in the region of said protrusion being resilient for allowing the passage of said protrusion over the diameter of said spherical stud when said first part is assembled on said second part.

8. An article of manufacture as claimed in claim 7, wherein said second part comprises a plastic.

9. An article of manufacture as claimed in claim 8, wherein said first part and said spherical stud are metallic and said stud is welded to said first part.

10. An article of manufacture as claimed in claim 7, wherein said resilient region of said second part comprises a circumferential groove surrounding said bore.

* * * * *